United States Patent
Lingala

(10) Patent No.: US 11,383,956 B2
(45) Date of Patent: Jul. 12, 2022

(54) SYSTEM AND METHOD FOR OPERATING ELEVATOR SYSTEM DURING LOCKDOWN

(71) Applicant: OTIS ELEVATOR COMPANY, Farmington, CT (US)

(72) Inventor: Ramesh Lingala, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 310 days.

(21) Appl. No.: 16/707,282

(22) Filed: Dec. 9, 2019

(65) Prior Publication Data

US 2020/0180907 A1 Jun. 11, 2020

(30) Foreign Application Priority Data

Dec. 10, 2018 (IN) .............................. 201811046583

(51) Int. Cl.
*B66B 5/02* (2006.01)
*B66B 1/34* (2006.01)
*B66B 3/00* (2006.01)

(52) U.S. Cl.
CPC ............ *B66B 5/024* (2013.01); *B66B 1/3461* (2013.01); *B66B 1/3476* (2013.01); *B66B 3/008* (2013.01); *B66B 5/022* (2013.01); *B66B 2201/40* (2013.01)

(58) Field of Classification Search
CPC ........... B66B 5/02; B66B 5/0031; B66B 3/00; B66B 5/021; B66B 1/24; B66B 1/36; B66B 3/006
See application file for complete search history.

(56) References Cited

U.S. PATENT DOCUMENTS

| 7,594,564 | B2* | 9/2009 | Siikonen | B66B 5/021 |
|---|---|---|---|---|
| | | | | 187/384 |
| 7,621,378 | B2* | 11/2009 | Kawai | B66B 5/024 |
| | | | | 187/313 |
| 7,728,712 | B2 | 6/2010 | Girgis et al. | |
| 8,230,980 | B2 | 7/2012 | Mason | |
| 8,230,981 | B2 | 7/2012 | Newville et al. | |

(Continued)

FOREIGN PATENT DOCUMENTS

| CN | 104010957 A | 8/2014 |
|---|---|---|
| CN | 106882669 A | 6/2017 |

(Continued)

OTHER PUBLICATIONS

European Search Report; Application No. 19215023.3; dated May 7, 2020; 8 pages.

(Continued)

*Primary Examiner* — Marlon T Fletcher
(74) *Attorney, Agent, or Firm* — Cantor Colburn LLP

(57) ABSTRACT

Disclosed is an elevator system including a system controller, wherein the system controller is configured to: render a plurality of determinations for effecting elevator service during a lockdown condition, including a first determination that an elevator car is transporting a first passenger to a first floor, a second determination that a lockdown event is occurring at a second floor, a third determination for the elevator car to transport the first passenger to a third floor to avoid travel proximate the second floor, and execute one or more communications including: a first communication to an elevator car controller for the elevator car to effect the third determination.

18 Claims, 4 Drawing Sheets

(56) References Cited

U.S. PATENT DOCUMENTS

| | | | |
|---|---|---|---|
| 8,839,914 B2* | 9/2014 | Iwata | B66B 5/024 |
| | | | 187/384 |
| 9,382,097 B2 | 7/2016 | Nagata | |
| 9,571,798 B2 | 2/2017 | Gorilovskij et al. | |
| 9,582,841 B2 | 2/2017 | Klein et al. | |
| 10,011,460 B2* | 7/2018 | Collins | B66B 3/006 |
| 10,029,884 B2 | 7/2018 | Youker et al. | |
| 2004/0163325 A1 | 8/2004 | Parrini et al. | |
| 2016/0358393 A1* | 12/2016 | Penland | G08B 25/10 |
| 2018/0093854 A1* | 4/2018 | Thebeau | B66B 5/021 |
| 2018/0093858 A1* | 4/2018 | Hughes | B66B 5/021 |
| 2018/0093860 A1* | 4/2018 | Saperstein | B66B 1/28 |

FOREIGN PATENT DOCUMENTS

| | | | | |
|---|---|---|---|---|
| CN | 107879203 A | | 4/2018 | |
| CN | 107879204 A | | 4/2018 | |
| EP | 3301057 A1 | * | 4/2018 | B66B 1/28 |
| EP | 3301057 A1 | | 4/2018 | |
| JP | 2004203623 A | | 7/2004 | |
| JP | 6404406 B1 | | 10/2018 | |
| WO | 2017021230 A1 | | 2/2017 | |

OTHER PUBLICATIONS

Kinateder et al.; "The Use of Elevators for Evacuation in Fire Emergencies in International Buildings"; Jul. 2014; US Department of Commerce, National Institute of Standards and Technology Technical Note 1825, 37 pages.

Shan, et al.; "Research on Elevator Safety Management Information Technology in Colleges and Universities: Taking Xian University of Technology as an Example"; 2018, American Journal of Environmental and Resources Economics, Science Publishing Group, 6 pages.

Chinese Office Action for application CN 201911251709.8, dated Oct. 9, 2021, 11 pages.

* cited by examiner

SYSTEM AND METHOD FOR OPERATING ELEVATOR SYSTEM DURING LOCKDOWN

CROSS-REFERENCE TO RELATED APPLICATION

This application claims the benefit of Indian Application No. 201811046583 filed Dec. 10, 2018, the disclosure of which is incorporated herein by reference in its entirety.

BACKGROUND

The embodiments herein relate to an elevator system and more specifically to an elevator system that provides proscribed elevator service during a lockdown event.

During a lockdown event, for example within a University building, passengers such as students and faculty who are in an elevator may be unaware of active conditions. An elevator with such passengers may stop at a locked-down floor as elevators may be unequipped to inform passengers about of safe floors, zones, save evacuation paths or the like. In addition, outdoor residents at a University may be unaware of a lockdown event occurring at a University, and may be unaware that they should avoid the University during this time.

SUMMARY

Disclosed is an elevator system comprising a system controller, wherein the system controller is configured to: render a plurality of determinations for effecting elevator service during a lockdown condition, including a first determination that an elevator car is transporting a first passenger to a first floor, a second determination that a lockdown event is occurring at a second floor, a third determination for the elevator car to transport the first passenger to a third floor to avoid travel proximate the second floor, and execute one or more communications including: a first communication to an elevator car controller for the elevator car to effect the third determination.

In addition to one or more of the above disclosed features and elements, or as an alternate, the third determination includes the controller rendering a fourth determination that the third floor includes access to a safety zone.

In addition to one or more of the above disclosed features and elements, or as an alternate, the controller is configured to render a fifth determination for a first mobile device associated with the first passenger to communicate an alert to the first passenger, wherein the alert is indicative of the lockdown event occurring on the second floor and that the third floor includes access to a safety zone, and execute a second communication to the first mobile device to effect the fifth determination.

In addition to one or more of the above disclosed features and elements, or as an alternate, the second communication includes instructing the mobile device to communicate directions for reaching the safety zone to the first passenger.

In addition to one or more of the above disclosed features and elements, or as an alternate, the first communication includes the controller instructing the elevator car to effect audible and/or visual alerts with on-board audible and/or visual implements, wherein the audible and/or visual alerts are indicative of the occurrence of the lockdown event occurring on the second floor and that the third floor includes access to the safety zone, and execute a third communication to the elevator car to effect the sixth determination.

In addition to one or more of the above disclosed features and elements, or as an alternate, prior to rendering the second determination the controller receives a communication from a third device, wherein the communication is indicative of the lockdown event occurring on the second floor, and the third device is one or more of a building management system (BMS), a front desk system (FDS) and a second mobile device associated with a second passenger or person, the second mobile device being communicatively connected to the elevator car and at least one of the BMS and the FDS to forward information indicative of the lockdown event occurring on the second floor.

In addition to one or more of the above disclosed features and elements, or as an alternate, the system controller communicates with a controller for the elevator car over a first network, and the system controller communicates with the first mobile device over a second network, and the system controller communicates with the third device over a third network.

In addition to one or more of the above disclosed features and elements, or as an alternate, the first network is a control area network, the second network is a personal area network (PAN), and the third network is a local area network or wide area network.

In addition to one or more of the above disclosed features and elements, or as an alternate, the system includes one or more beacons for communicating over the PAN.

Further disclosed is a university including a BMS and an FDS and a system that includes one or more of the above disclosed features and elements.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
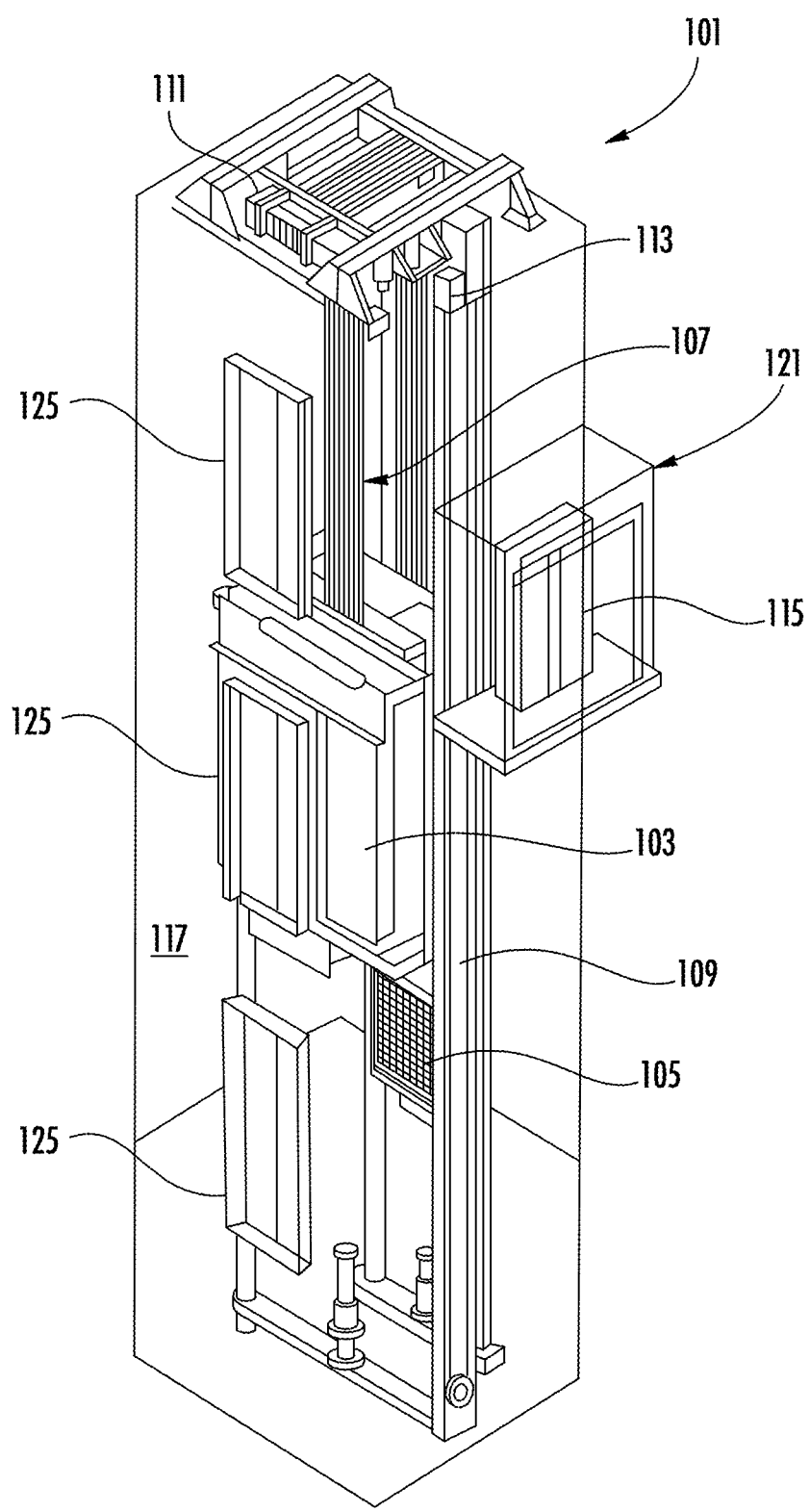
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

The following figures illustrate additional technical features associated with one or more disclosed embodiments. Features disclosed in the following figures having nomenclature similar to features disclosed in FIG. 1 may be similarly construed though being positively reintroduced with numerical identifiers that may differ from those in FIG. 1. Further, process steps disclosed hereinafter may be sequentially numbered to facilitate discussion of one or more disclosed embodiments. Such numbering is not intended to identify a specific sequence of performing such steps or a specific requirement to perform such steps unless expressly indicated.

Figure 2:
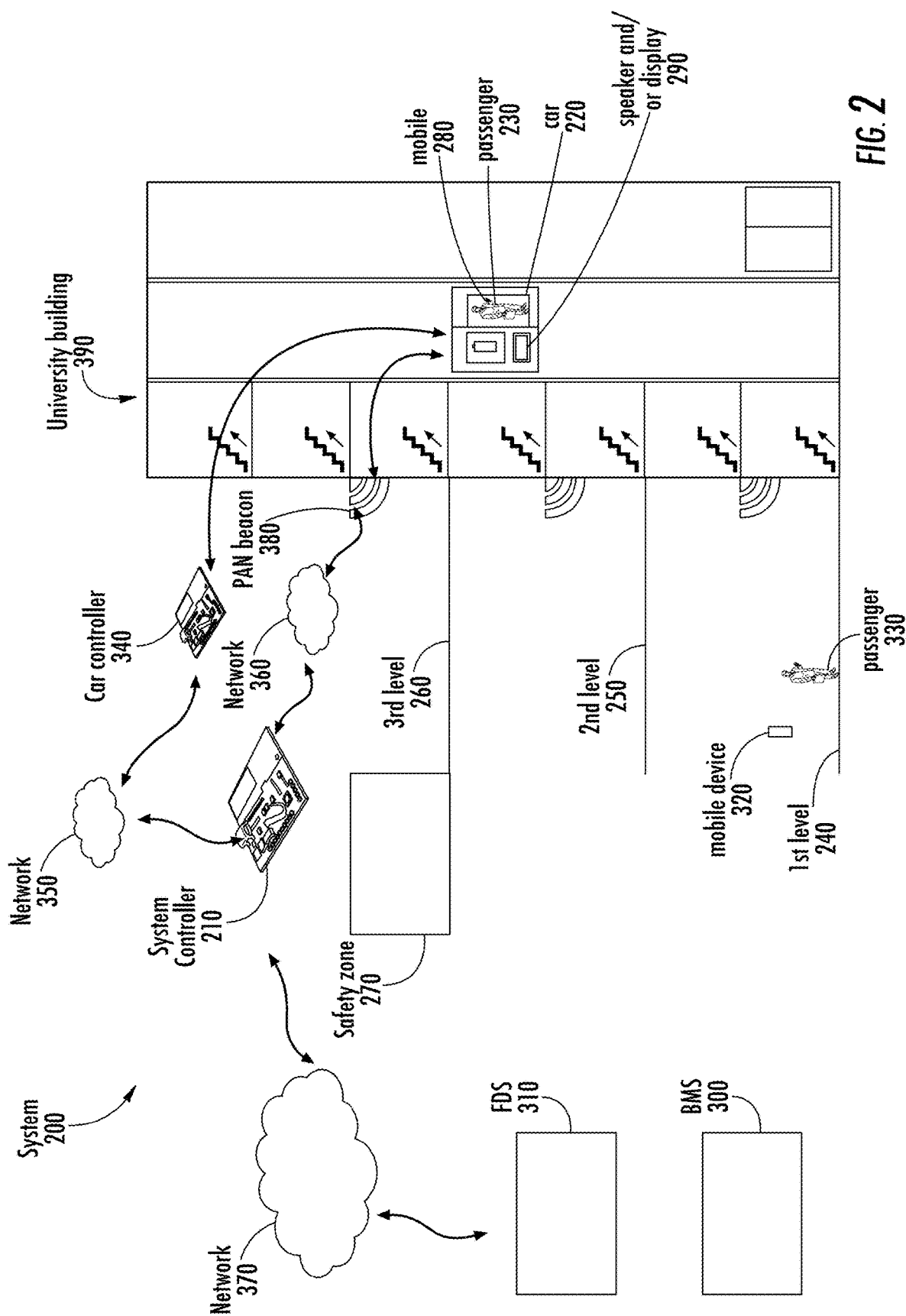
FIG. 2 illustrates elements of a disclosed system according to one or more embodiments.
Figure 3:
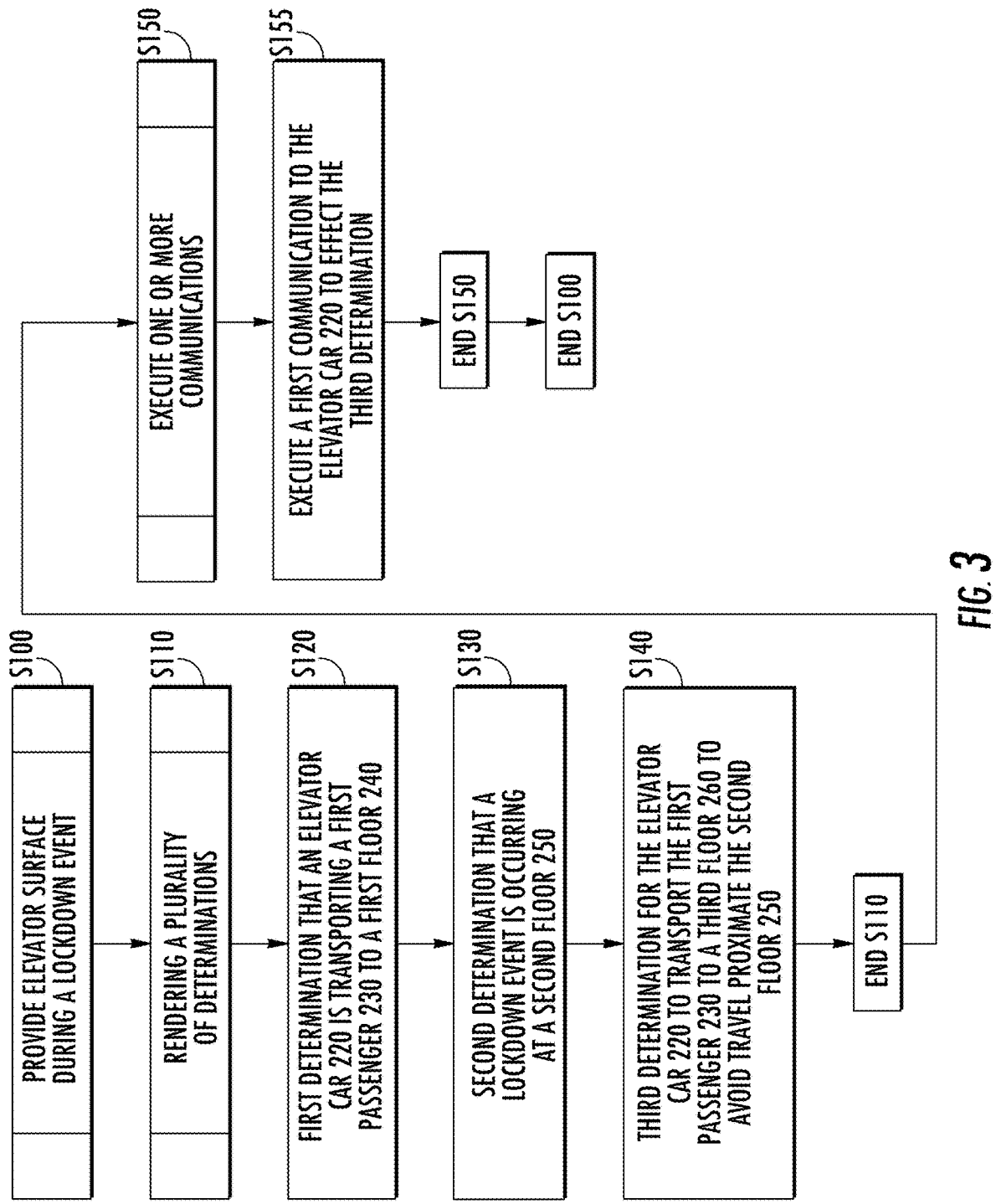
FIGS. 3-5 illustrate elements of a process performed by the disclosed system according to one or more embodiments.

Turning to FIGS. 2 and 3, disclosed is an elevator system 200 that includes a system controller 210. At step S100 the controller 210 is configured provide elevator service during a lockdown event. Step S100 includes the controller 210 executing step S110 of rendering a plurality of determinations. Step S110 includes step S120 of rendering a first determination that an elevator car 220 is transporting a first passenger 230 to a first floor 240. A second determination S130 includes that a lockdown event is occurring at a second floor 250. A third determination at step S140 for the elevator car 220 to transport the first passenger 230 to a third floor 260 to avoid travel proximate the second floor 250. After rendering the plurality of determinations, at step S150 the controller 210 may execute one or more communications including step S155 of executing a first communication to an elevator car controller 340 for the elevator car 220 to effect the third determination. It is to be appreciated that the floor designations are not intended to be limiting. For example the scope of the disclosure includes the first floor being the same as (or different than) the second floor and/or third floor.

Figure 4:
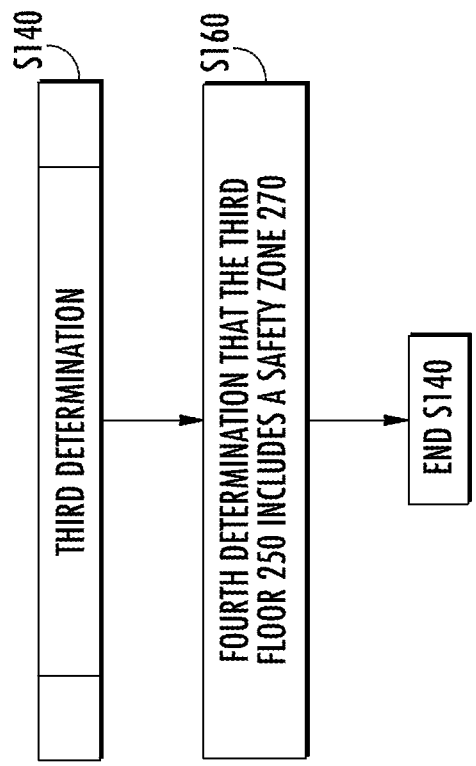

According to an embodiment, as illustrated in FIG. 4, the third determination at step S140 includes step S160 of rendering a forth determination that the third floor 250 includes a safety zone 270. The safety zone 270 may be an area in a common hallway or room, a stairwell, or the like. The safety zone 270 may be on a different floor that can be accessed through the third floor 260. The safety zone 270 may also be a "sheltering-in-place" area, created or identified for people to occupy in the event of a Lockdown.

Figure 5:
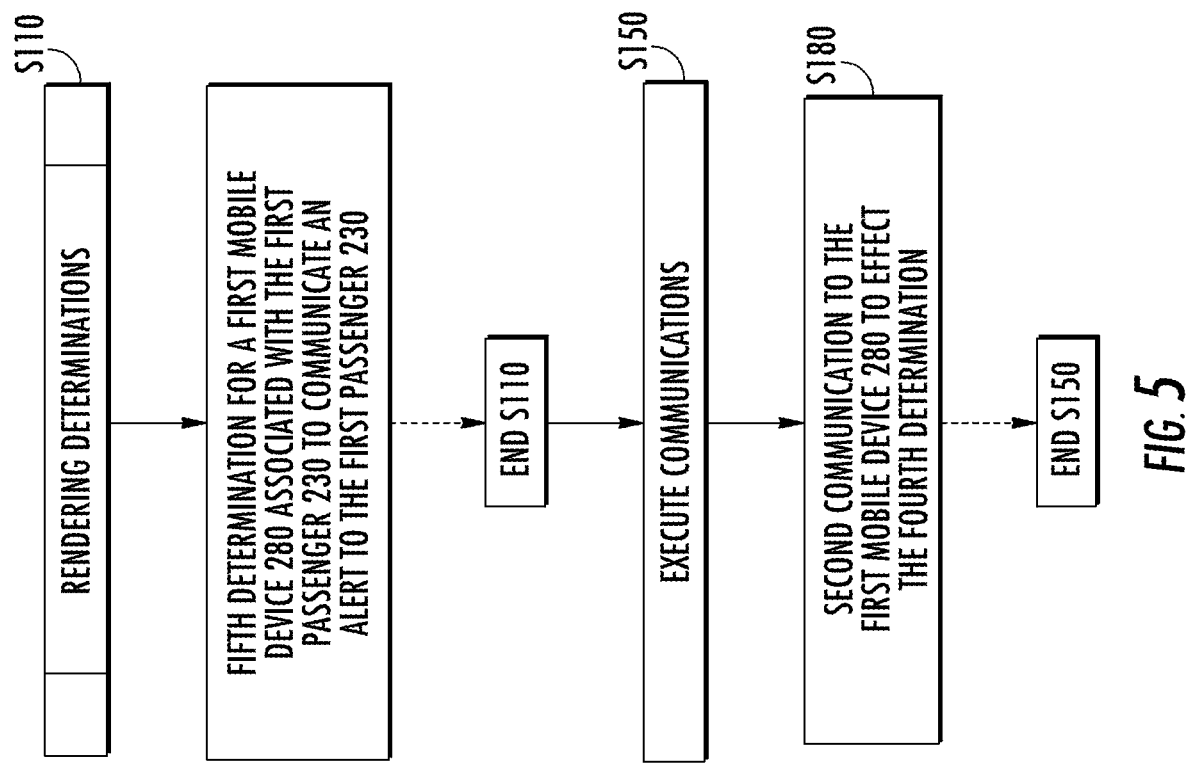

According to an embodiment, illustrated in FIG. 5, step S110 includes step S170 of the controller 210 rendering a fifth determination for a first mobile device 280 associated with the first passenger 230 to communicate an alert to the first passenger 230. The alert may be indicative of the lockdown event occurring on the second floor 250, and that the third floor 260 includes access to a safety zone 270. Step S150 may include step S180 of the controller 210 executing a second communication to the first mobile device 280 to effect the fourth determination.

According to a further embodiment the second communication at step S180 includes instructing the first mobile device 280 to communicate to the first passenger 230 directions for reaching the safety zone 270. According to an embodiment the first communication includes the controller 210 instructing the elevator car to effect audible and/or visual alerts with on-board audible and/or visual implements 290. The audible and/or visual, for example via speakers and video panels, alerts may be indicative of the occurrence of the lockdown event occurring on the second floor 250 and that the third floor 260 includes access to the safety zone 270.

According to an embodiment prior to rendering the second determination, the controller 210 receives a communication from a third device 300, wherein the communication is indicative of the lockdown event occurring on the second floor 250. The third device may be one or more of a building management system 300, a front desk system 310 and a second mobile device 320 of a second person 330. The second mobile device 320 in this configuration may be communicatively connected to the elevator car 220, at least one of the building management systems 300 and the front desk system 310. With this configuration, the second mobile device 320 may forward information to the controller 210 that includes information indicative of the lockdown event occurring on the second floor. For example, the second mobile device 320 may covey the lockdown information to the system controller 210 over a network 370 (identified below). That is, the front desk system 310 may communicate with the mobile device 320, which may communicate with the system controller 210 over the network 370.

According to an embodiment the system controller 210 may communicate with the controller 340 for the elevator car 220 over a first network 350. The elevator car controller 340 may be locally located, remotely located, accessible over a cloud connection, and may be capable of communicating using wired protocols, wireless protocols, etc. The system controller 210 may communicate with the first mobile device 280 over a second network 360. Such network 360 may be any type of telecommunications network, including a local network executing protocols such as Bluetooth, Wi-Fi, for example, and may include the Internet, cellular networks, satellite networks, etc.

Further, the system controller 210 may communicate with the third device 300 over a third network 370. One or more beacons 380 may be provided for communicating over the PAN. The first network may be a control area network (CAN), the second network may be a personal area network (PAN), and the third network may be a local or wide area network (LAN or WAN). According to one application of the embodiments, the system 200 may be implemented in a building 390, which may be within a University and the first mobile device 280 and second mobile device 320 may be student mobile phones.

Additionally, in one embodiment, a second determination by the controller may include determining that a lockdown event is occurring at a second floor. The controller may convey this information to a mobile device of an outdoor student or staff member (for example a professor), where the mobile device is executing a mobile application (App) registered by the outdoor student or staff member. An outdoor student or staff member may be a person walking around or arriving at a University. With the App, the mobile device may display a nearest safe zone along with a route map, for example using a text or voice message, utilizing a cellular network or a land based wireless network, such as Wi-Fi.

Disclosed above is an elevator group controller (EGC) is interconnected with a building management system (BMS). During a lockdown event (LE), the EGC may receive an LE alert status from a front desk system (FDS) directly and/or through a mobile device in possession of a building occupant. The EGC may convey the lockdown status to an elevator controller (EC) for an elevator car. The elevator car may be equipped with audio and video consoles and the EGC may instruct the EC to convey the LE information to one or more elevator occupants using both the audio and video consoles. The EGC may decide a safe destination floor based on a present location and a locked-down floor. The EGC may direct the EC to bring the elevator car to a safe floor/zone. The EGC may also communicate with a second mobile device associated with a passenger and inform the second mobile device about safe floors, zones, save evacuation paths or the like. In one embodiment the (FDS) is a University FDS, the building is a college campus building, and the first device and second device may be in possession of students, and the wireless protocols, including Wi-Fi, Bluetooth, zWave, Zigbee, cellular and the like.

In addition, the EGC may communicate with the elevator car over a controller area network (CAN) with a CAN Bus. In addition the EGC controller may communicate with the mobile devices over a personal area network (PAN) using over a network beacons applying, for example, Bluetooth. The EGC may communicate with the BMS over a local area network (LAN) over a LAN access point. The CAN bus, PAN and LAN are examples of suitable networks; it is understood that other network topologies may be used in the disclosed system.

As used herein an elevator controller and/or elevator group controller (EGC) may be a microprocessor based controller that controls many aspects of the elevator operation. A series of sensors, controllers, sequences of operation and real-time calculations or algorithms that balance passenger demand and car availability. Elevator sensors may provide data on car positions, car moving direction, loads, door status, hall calls, car calls, pending up hall and down hall calls, number of runs per car, alarms, etc. The controllers may also have a function enabling the testing the systems without shutdown of the elevator. From collected data, a management system consisting of a workstation and software applications that may create metrics for a group or particular car such as total number of door openings, number of runs per car or call, up and down hall calls, etc. Some performance indicators may be related to passenger wait times and/or elevator car travel times. These metrics may indicate inadequate controls, misconfiguration or even equipment malfunction. Elevator monitoring may be provided as Software as a Service (SaaS). The monitoring may identify malfunctions or abnormal operating parameters and automatically dispatch a technician and/or provide alerts to relevant persons such as building owners. Some systems may provide customer dashboards accessible via a web browser and/or provide owners with information such as performance summaries and maintenance histories. As indicated, the elevator controller may communicate with the one or more elevators over a Controller Area Network (CAN) bus. A CAN is a vehicle bus standard that allow microcontrollers and devices to communicate with each other in applications without a host computer. CAN is a message-based protocol released by the International Organization for Standards (ISO). Downstream communications from the elevator system controller may be over a LAN.

Further, a building management system (BMS), referenced above, may be otherwise known as a building automation system (BAS). The BMS is a computer-based control system installed in buildings that may have a need for controlling and monitoring mechanical and electrical equipment such as ventilation, lighting, power systems, fire systems, security systems, fire alarm systems and elevator systems. In addition to controlling an internal environment in a building, BMS systems may provide for access control (access doors) for implementing building security protocols, or to control other security systems such as closed-circuit television (CCTV) and motion detectors. A BMS may be responsible for controlling equipment that accounts for a majority of energy usage in a building. As indicated the elevator system controller may communicate with the BMS over a LAN.

A front desk system (FDS), as referenced herein, may be also referred to as a property management system, and is a technology solution that automates many of the administrative tasks the front desk staff is responsible for. The front desk system may store the guest information at a property. The system manages check-in and check-out details, such as provided with building identification cards, and provides for recording of special instructions for extenuating circumstances. The front desk system also records data, manages bookkeeping and provides for generating reports about a usage of a building.

As used herein, mobile devices may be "smart devices" and may contain one or more processors capable of communication using with other such devices by applying wired and/or wireless telecommunication protocols. Non-limiting examples of a smart device include a mobile phone, personal data assistant (PDA), tablet, watch, wearable or other processor-based devices. An application executed by such devices may be identified as an "App", and may be available from an App Store, which is a digital distribution platform for distributing computer software applications over the Internet. Apps contain program level protocols enabling structured and logical communications between devices. Communication protocols applied by smart devices may include cellular, local area network (LAN) protocols and/or a private area network (PAN) protocols. LANs that apply Transport Control Protocol/Internet Protocol (TCP/IP protocol), for example, through a default gateway, may be interconnected over the Internet, and such systems that share computing resources over the Internet may be considered as computing over a Cloud. Locally, LAN protocols may apply Wi-Fi technology for communicating over Wi-Fi access points. Wi-Fi technology is a technology based on the Section 802.11 standards from the Institute of Electrical and Electronics Engineers, or IEEE. Technology applying PAN protocols may communicate over PAN beacons. PAN technology includes, for example, Bluetooth Low Energy (BTLE), which is a wireless technology standard designed and marketed by the Bluetooth Special Interest Group (SIG) for exchanging data over short distances using short-wavelength radio waves. PAN protocols may also include Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Wireless protocols may further include short range communication (SRC) protocols, which may be utilized with radio-frequency identification (RFID) technology. RFID may be used for communicating with an integrated chip (IC) on an RFID smartcard. Wireless protocols may further include long range, low powered wide area network (LoRa and LPWAN) protocols that enable low data rate communications to be made over long distances by sensors and actuators for machine-to-machine (M2M) and Internet of Things (IoT) applications.

The above embodiments may be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising a system controller, wherein the system controller is configured to:
   render a plurality of determinations for effecting elevator service during a lockdown condition, including
      a first determination that an elevator car is transporting a first passenger to a first floor,
      a second determination that a lockdown event is occurring at a second floor,
      a third determination for the elevator car to transport the first passenger to a third floor to avoid travel proximate the second floor, and
   execute one or more communications including:
      a first communication to an elevator car controller for the elevator car to effect the third determination,
      wherein the third determination includes the system controller rendering a fourth determination that the third floor includes access to a safety zone, wherein the safety zone is a common area on the third floor or a different floor accessible through the third floor.

2. The system of claim 1 wherein the system controller is configured to
   render a fifth determination for a first mobile device associated with the first passenger to communicate an alert to the first passenger, wherein the alert is indicative of the lockdown event occurring on the second floor and that the third floor includes access to a safety zone, and
   execute a second communication to the first mobile device to effect the fifth determination.

3. The system of claim 2 wherein the second communication includes instructing the mobile device to communicate directions for reaching the safety zone to the first passenger.

4. The system of claim 3 wherein
the first communication includes the system controller instructing the elevator car to effect audible and/or visual alerts with on-board audible and/or visual implements, wherein the audible and/or visual alerts are indicative of the occurrence of the lockdown event occurring on the second floor and that the third floor includes access to the safety zone, and
execute a third communication to the elevator car to effect the sixth determination.

5. The system of claim 1 wherein
prior to rendering the second determination the system controller receives a communication from a third device, wherein the communication is indicative of the lockdown event occurring on the second floor, and
the third device is one or more of a building management system (BMS), a front desk system (FDS) and a second mobile device associated with a second passenger or person, the second mobile device being communicatively connected to the elevator car and at least one of the BMS and the FDS to forward information indicative of the lockdown event occurring on the second floor.

6. The system of claim 5 wherein the system controller communicates with an elevator car controller for the elevator car over a first network, and the system controller communicates with the first mobile device over a second network, and the system controller communicates with the third device over a third network.

7. The system of claim 6 wherein the first network is a control area network, the second network is a personal area network (PAN), and the third network is a local area network or wide area network.

8. The system of claim 7 wherein the system includes one or more beacons for communicating over the PAN.

9. A university including a BMS and an FDS and the system of claim 8.

10. A method for controlling an elevator system with a system controller, the method comprising the system controller:
rendering a plurality of determinations for effecting elevator service during a lockdown condition, including
a first determination that an elevator car is transporting a first passenger to a first floor,
a second determination that a lockdown event is occurring at a second floor,
a third determination for the elevator car to transport the first passenger to a third floor to avoid travel proximate the second floor, and
executing one or more communications including:
a first communication to an elevator car controller for the elevator car to effect the third determination,
wherein the third determination includes the system controller rendering a fourth determination that the third floor includes access to a safety zone, wherein the safety zone is a common area on the third floor or a different floor accessible through the third floor.

11. The method of claim 10 wherein the system controller is configured to
render a fifth determination for a first mobile device associated with the first passenger to communicate an alert to the first passenger, wherein the alert is indicative of the lockdown event occurring on the second floor and that the third floor includes access to a safety zone, and
execute a second communication to the first mobile device to effect the fifth determination.

12. The method of claim 11 wherein the second communication includes instructing the mobile device to communicate directions for reaching the safety zone to the first passenger.

13. The method of claim 12 wherein
the first communication includes the system controller instructing the elevator car to effect audible and/or visual alerts with on-board audible and/or visual implements, wherein the audible and/or visual alerts are indicative of the occurrence of the lockdown event occurring on the second floor and that the third floor includes access to the safety zone, and
execute a third communication to the elevator car to effect the sixth determination.

14. The method of claim 10 wherein
prior to rendering the second determination the system controller receives a communication from a third device, wherein the communication is indicative of the lockdown event occurring on the second floor, and
the third device is one or more of a building management system (BMS), a front desk system (FDS) and a second mobile device associated with a second passenger or person, the second mobile device being communicatively connected to the elevator car and at least one of the BMS and the FDS to forward information indicative of the lockdown event occurring on the second floor.

15. The method of claim 14 wherein the system controller communicates with an elevator car controller for the elevator car over a first network, and the system controller communicates with the first mobile device over a second network, and the system controller communicates with the third device over a third network.

16. The method of claim 15 wherein the first network is a control area network, the second network is a personal area network (PAN), and the third network is a local area network or wide area network.

17. The method of claim 16 wherein the system includes one or more beacons for communicating over the PAN.

18. A university including a BMS and an FDS, and an elevator system that includes a system controller executing the method of claim 17.

* * * * *